United States Patent [19]

Brueggemann

[11] Patent Number: 4,870,273
[45] Date of Patent: Sep. 26, 1989

[54] JITTER REDUCTION IN ROTATING POLYGON SCANNING SYSTEMS

[75] Inventor: Harry P. Brueggemann, San Marino, Calif.

[73] Assignee: Xerox Corporation, Stamford, Conn.

[21] Appl. No.: 315,221

[22] Filed: Feb. 24, 1989

Related U.S. Application Data

[63] Continuation of Ser. No. 82,627, Aug. 7, 1987, abandoned.

[51] Int. Cl.[4] .............................................. H04N 1/04
[52] U.S. Cl. .................................. 250/235; 250/236; 350/6.7; 358/494
[58] Field of Search ............................ 250/235, 236; 350/6.5–6.91; 358/293, 302, 206, 208

[56] References Cited

U.S. PATENT DOCUMENTS

| | | | |
|---|---|---|---|
| 3,987,132 | 7/1975 | Meeussen et al. | 350/6.7 |
| 4,143,403 | 3/1979 | Ohnishi | 358/293 |
| 4,214,157 | 7/1980 | Check, Jr. et al. | 358/302 |
| 4,312,590 | 1/1982 | Harbaugh | 350/6.7 |
| 4,433,894 | 2/1984 | Hanson et al. | 250/236 |
| 4,620,237 | 10/1986 | Traino et al. | 350/6.8 |
| 4,733,064 | 3/1988 | Ishikawa | 350/6.8 |

OTHER PUBLICATIONS

Garwin; "Means for Compensating Facet Tilt on a Rotating-Mirror Scanner"; IBM Tech. Disc. Bull.; vol. 24, No. 7A, Dec. '81; pp. 3252-3254.

Primary Examiner—Edward P. Westin
Attorney, Agent, or Firm—Robert E. Cunha

[57] ABSTRACT

This invention relates to a pyramid polygon scanner without cylinder optics wherein the effects of jitter are reduced by the use of a start of scan detector situated at a predetermined angle from the normal (vertical) position. The start of scan detector is rotated about an axis through the nominal scan line. Thus, if tilt (not the draft angle) is present in the rotating polygon system and jitter is generated, the rotation angle of the split detector moves the jitter to the beginning and end of scan, leaving the center of scan free of the effects of jitter. The angle of the split detector is in approximate relation to the angle of incidence at the first reflection on the rotating polygon.

6 Claims, 2 Drawing Sheets

JITTER REDUCTION IN ROTATING POLYGON SCANNING SYSTEMS

This is a continuation of application Ser. No. 082,627, filed Aug. 7, 1987, and now abandoned.

This invention relates to a pyramid polygon scanner without cylinder optics wherein the effects of jitter are reduced by the use of a start of scan detector situated at a predetermined angle from the normal position.

BACKGROUND OF THE INVENTION

It is known that wobble can be corrected by double reflection from the active facet; see Meeussen et al, U.S. Pat. No. 8,897,132. But all previous embodiments of this concept have bow, which makes them unworkable. In copending application Ser. No. 876,648, a polygon system for correcting wobble by double reflection from the active facet, without bow, is disclosed. In this application, the angles of incidence at the first and second reflection from the facet are recognized as important to the effects of bow, and bow can be almost eliminated by the proper relation between these angles. Bow can be, for all practical purposes, entirely eliminated when the facets have a draft angle, which has a predetermined relation to the angles of incidence at the first and second reflection.

This concept corrects for wobble exactly, at the center of scan. But at the edge of scan, wobble correction is not exact, and there is some residual effect.

Since the beam is offset in the cross-scan plane, as the polygon rotates, the reflected scanning beam after the first reflection will not be in a flat plane. It will lie on the surface of a cone, the apex angle of which is dependent on the offset angle. If the offset angle is changed by a facet tilt, the apex angle of the cone surface containing the reflected ray will change, and the diameter of the cone at some distance from the first reflection will change.

After the second reflection, the curvature of the cone surface is cancelled, and the beam scan will be in a flat plane. This is the principle of bow correction of the concept set forth in said copending application. It can be thought of as the cone being opened up and laid on a flat surface. But if the facet has a tilt angle, the flattened cone will not be the same size as the flattened nominal cone. This means that the scan length, for the same polygon rotation angle, is different for a facet with a tilt angle than for a facet without a tilt angle. The difference is "jitter".

The start of scan detector will start the scan clock when the beam crosses it. Thus, at the beginning of the scan, information will be contiguous with the same information of adjacent scans, whether or not the facet has tilt. But at the end of scan, if the facet has a tilt angle, the information will not be in synchronization with information of adjacent scans.

Jitter can be changed in the concept disclosed in Ser. No. 876,648 by changing the angle of incidence at the first reflection from the facet. But any reduction of jitter is invariably accomplished by an increase in residual wobble at the end of scan.

For some low performance applications of this technique, particularly if the scan length at the photoreceptor is 8 inches, jitter and wobble are within specifications. But if the scan length is increased, either jitter or wobble will exceed specifications.

According to the present invention, the start of scan detector is positioned about an axis through the nominal scan line. Thus, if tilt is present in the rotating polygon system and jitter is generated, the angle of the split detector moves the jitter to the beginning and end of scan, leaving the center of scan free of the effects of jitter. The angle of the split detector offset is in approximate relation to the angle of incidence at the first reflection on the rotating polygon.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
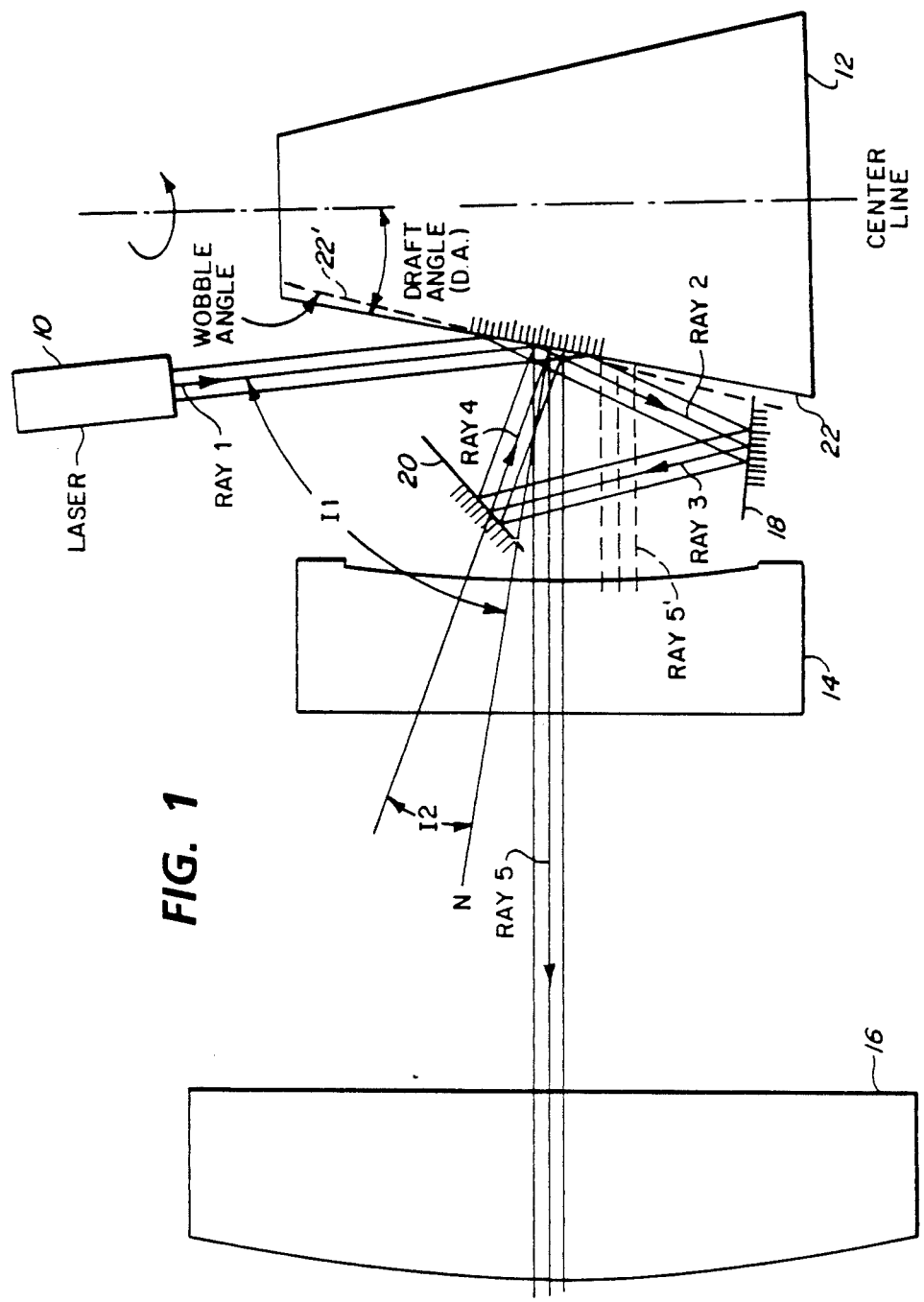
FIG. 1 is a representative schematic diagram of the rotating polygon system disclosed and described in said copending application.

The invention disclosed in said copending application is seen in FIG. 1, which is a section through the center of scan. Rotating polygon 12 is seen to rotate about a line denoted as the center line. This polygon could have any number of facets, while for this application, the rotating polygon has eight distinct facets. Rather than having the plane of each facet parallel to the axis of rotation, or the center line as shown by the prior art, the facets are tilted at an angle toward the center line at an angle denoted as the "draft angle" (D.A.). Impinging upon one facet 22 of rotating polygon 12 is the light from laser 10. No optics are shown between the laser 10 and facet 22 for ease of illustration, but certain optics could be necessary depending upon the type of laser chosen. Ray 1 coming from the laser is co-planar with the center line, and is directed to facet 22 of rotating polygon 12. The light strikes the polygon and is reflected off with the normal angle of incidence equalling the angle of reflection. The angle I1 is defined in FIG. 1 as the angle between laser ray 1 and the surface of facet 22 as measured from the normal to the surface 22, labelled "N" in the Figure.

For this definition of I1, the normal to the facet 22 is taken to be in the plane of the paper, and is co-planar with the centerline and with ray 1. This position of the normal is defined as the center of scan. After the light is reflected by facet 22, it travels to mirror surface 18. Thus, ray 2 is ray 1 reflected by facet 22. Whereas ray 1 is stationary in space regardless of the position of the polygon, ray 2 rotates as the polygon rotates. Mirror surface 18 must be large enough in the direction perpendicular to the paper so that ray 2 strikes it at all times during the active scan of facet 22. Ray 2 is reflected from mirror surface 18, and is shown as ray 3. From surface 18 the ray 3 travels to mirror surface 20, from which it is reflected as ray 4, seen in FIG. 1. Since ray 3 is rotating at the same angular rate as ray 2, the mirror surface 20 must be even larger than surface 18 to reflect ray 3 during active scan, because surface 20 is optically further from the facet 22 than surface 18. Ray 4 now travels back to surface 22, still with the same angular rate it had after being reflected from 22 as ray 2. Facet 22 need not be larger than mirror surface 20, in the direction of scan, to intercept all positions of ray 4, because the mirror is rotating in the same direction as ray 4, and "tracks" the ray. The spacing between mirrors 18 and 20, and facet 22, must be kept small so that the mirrors do not become too large. One skilled in the art of designing underfilled facet scanners will know how to choose the correct values of the laser beam parameters, so that the mirrors and the polygon do not become too large.

Ray 4 has many angles of incidence with facet 22 during the scan, because it rotates as the polygon rotates. Only one of these angles is defined as I2 in FIG. 1, this is the angle between ray 4, and the normal to facet 22 in the plane of the paper as in FIG. 1. After reflection again by facet 22, ray 4 becomes ray 5, which is the ray that is corrected for facet-to-facet wobble after focussing by lens system 14 and 16, and at the same time will have no bow.

The property possessed by ray 5 that makes it corrected for wobble and free of bow, is that when it is projected onto the plane of the paper (center of scan position) of FIG. 1, it is always parallel to itself. At various positions during the active scan, the ray 5 moves over the surface of facet 22, and its projection onto the center of scan position will be translated from the position of ray 5, but it will remain parallel to itself during this translation. This is true because the angles I1 and I2 have been chosen with the proper relation between them, and also the draft angle has been chosen to have the proper relation to them.

The beam surrounding ray 1 is collimated, all rays of the beam are parallel to each other. Mirror surfaces 18 and 20, as well as the facet 22, are all flat surfaces, with no optical power. Thus the beam surrounding ray 5 is still collimated. A scan lens following the facet 22 will focus the parallel rays of the collimated beam around ray 5 as a small spot at a document or a photosensitive surface.

The projection of ray 5' and the collimated beam around it are all parallel to the projection of ray 5, and thus will also focus at the same small spot as the beam around ray 5. Since the projection onto the plane of the paper of all rays is the same point at the document or the photosensitive surface, then in three-dimensional space they must all lie on a straight line perpendicular to the plane of the paper. This is the scan line at the document or photosensitive surface, and since it is straight, it has no bow.

Jitter, however, is never a problem at the start of scan. It is the function of the start-of-scan detector to compensate for this. The severe effect is at the end of scan. But, if the zero point of the jitter is moved to the center of scan instead of the start, the effect of jitter at the end of scan will be cut in half. For most applications, jitter and wobble would then be within specifications. There would be jitter at the start of scan, but it would be within specifications.

If the facet following facet 22 (facet 22') has a different draft angle than facet 22 (defined as facet to facet tilt), or if the bearings supporting the polygon impart a tilt to the center line, the projection of ray 5' will be displaced from the projection of ray 5, as shown in FIG. 1. Near the center of scan, ray 5' is, for all practical purposes, parallel to ray 5, and there will be no visible bow for this tilted scan. But near the edges of the scan, tilt causes a slight bow, which can be used to correct jitter. The direction of the bow has the same sign as the direction of the tilt. If the tilt is positive, the slight bow is positive, and if the tilt is negative, the bow is negative.

There is a fixed relationship between the jitter and bow caused by the facet-to-facet tilt angle. For a particular design, a given amount of facet tilt will produce a specific amount of jitter and bow. If the facet tilt angle (not the Draft Angle) is increased, both jitter and wobble will be increased proportionally. If the sign of the facet tilt is reversed, the sign of both jitter and bow will be changed.

This relationship between jitter and bow can be changed by changing the design. If jitter is twice as much as bow for one design, it can be changed so that jitter is equal to bow, or even that jitter is half as much as bow.

To explain the present invention, it is assumed for the moment that jitter is equal to bow. Measured from the center of scan as the zero point, then at the start of scan, a jitter of +0.001 inches, in the scan direction, will be accompanied by a bow of +0.001 inches, in the cross-scan direction (depending on definitions, this might be −0.001 inches of bow). Also, if the jitter is −0.001 inches, the bow will be −0.001 inches. Thus, the starting points of the scan line will generate a straight line, at a predetermined angle of, say, 45 degrees to the scan, as facet tilt angle is changed from some positive value to a negative value.

Figure 2:
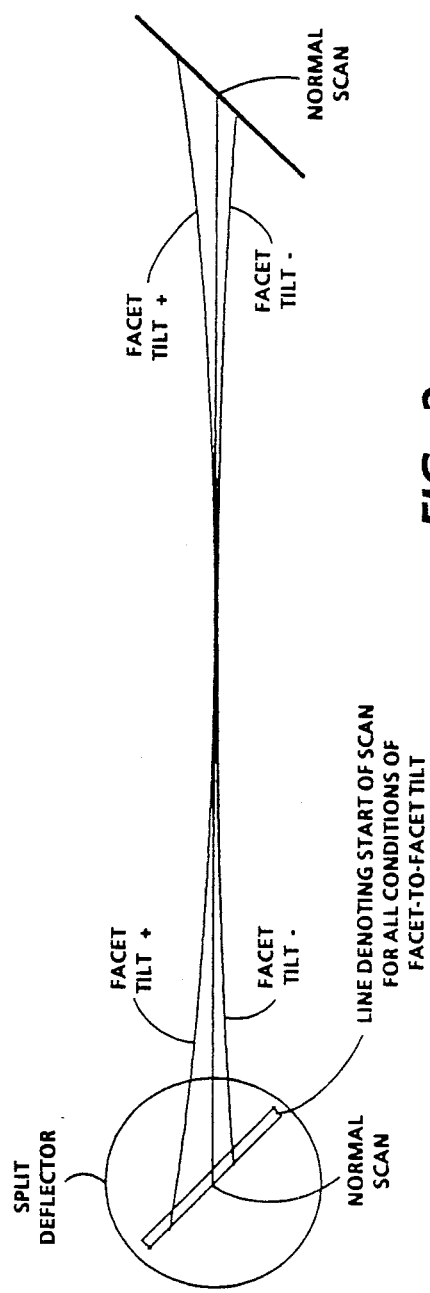
FIG. 2 is a diagram of the three separate scan lines with the split detector positioned in accordance with the principles of the present invention.

To create a zero jitter condition at the center of scan, it is only necessary to position the angle of the division line of the split start-of-scan detector to 45 degrees, or so, to the scan line (see FIG. 2). Since the start of scan signal generated by the offset split detector comes early or late, depending on the amount of tilt, the jitter is zero at the center of scan, rather than the start of scan, as in the prior art. The angle of the split detector offset is in approximate relation to the angle of incidence at the first reflection on the rotating polygon.

If the design is such that jitter is twice wobble for any facet tilt angle, then the angle of the division line is 63.4 degrees to the scan line, for zero jitter at the center of scan. Conversely, if jitter is half of wobble, the division line angle is 26.6 degrees. For any given design, there is always an angle of the division line of the split detector that will produce a zero jitter condition at the center of scan.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a rotating mirror scanning system including a multi-surface mirror assembly having an axis of rotation, a light source for introducing a source of light toward said multi-surface mirror, said light being reflected in turn by each of said surfaces of said mirror, a first mirror placed in the path of said reflected light from said multi-surface mirrors, a second mirror placed in the path of said reflected light from said first mirror, said second mirror reflecting said light back to the same surface of said multi-surface mirror, said last reflection being a scanning light beam of predetermined range of arc of one rotation of said multi-surface mirror, said multi-surface mirror assembly comprising a polygonal array of mirror facets, said mirror facets having a predetermined draft angle with respect to the axis of rotation of said multi-surface mirror assembly, the improvement comprising a start of scan detector at the beginning of the nominal scan line of said scanning light beam, said detector having a face parallel to the plane of the surface to be scanned and having a slot in said face, said slot of said scan detector being positioned at a predetermined angle of between zero and plus or minus ninety degrees from said nominal scan line.

2. The rotating mirror scanning system as set forth in claim 1 wherein said start of scan detector is fixed about an axis defined by the point at which the nominal scan line crosses said start of scan detector.

3. A raster scanning system wherein light is caused to continually scan a document or other surface, comprising means for generating a scanning light beam, start of scan means for detecting the scanning presence of said light beam and indicating that the scan line has begun, said means for detecting having a face parallel to the plane of the surface to be scanned and having a slot in said face, said slot of said start of scan means being positioned at an angle of between zero and plus or minus ninety degrees to said scan line.

4. The raster scanning system as set forth in claim 3 wherein said start of scan detector is fixed about an axis defined by the point at which a nominal scan line crosses said start of scan detector.

5. In a rotating mirror scanning system including a multi-surface mirror assembly having an axis of rotation, a light source for introducing a source of light toward said multi-surface mirror, said light being reflected in turn by each of said surfaces of said mirror, a first mirror placed in the path of said reflected light from said first mirror, said second mirror reflecting said light back to the same surface of said multi-surface mirror, said last reflection being a scanning light beam of predetermined range of arc of one rotation of said multi-surface mirror, said multi-surface mirror assembly comprising a polygonal array of mirror facets, said mirror facets having a predetermined draft angle with respect to the axis of rotation of said multi-surface mirror assembly, the improvement comprising a start of scan detector at the beginning of a nominal scan line of said scanning light beam, said detector having a face parallel to the plane of the surface to be scanned and having a slot in said face, said slot of said scan detector being positioned at a predetermined angle of between zero and plus or minus ninety degrees from said nominal scan line.

6. The rotating mirror scanning system as set forth in claim 5 wherein said start of scan detector is fixed about an axis defined by the point at which the nominal scan line crosses said start of scan detector.

* * * * *